Oct. 11, 1966 R. A. LIGHTBURN 3,277,598
FRAMES FOR USE IN STORING PHOTOGRAPHIC SLIDES
Filed June 15, 1964 3 Sheets-Sheet 1

INVENTOR.
Robert A. Lightburn
BY
ATTORNEY

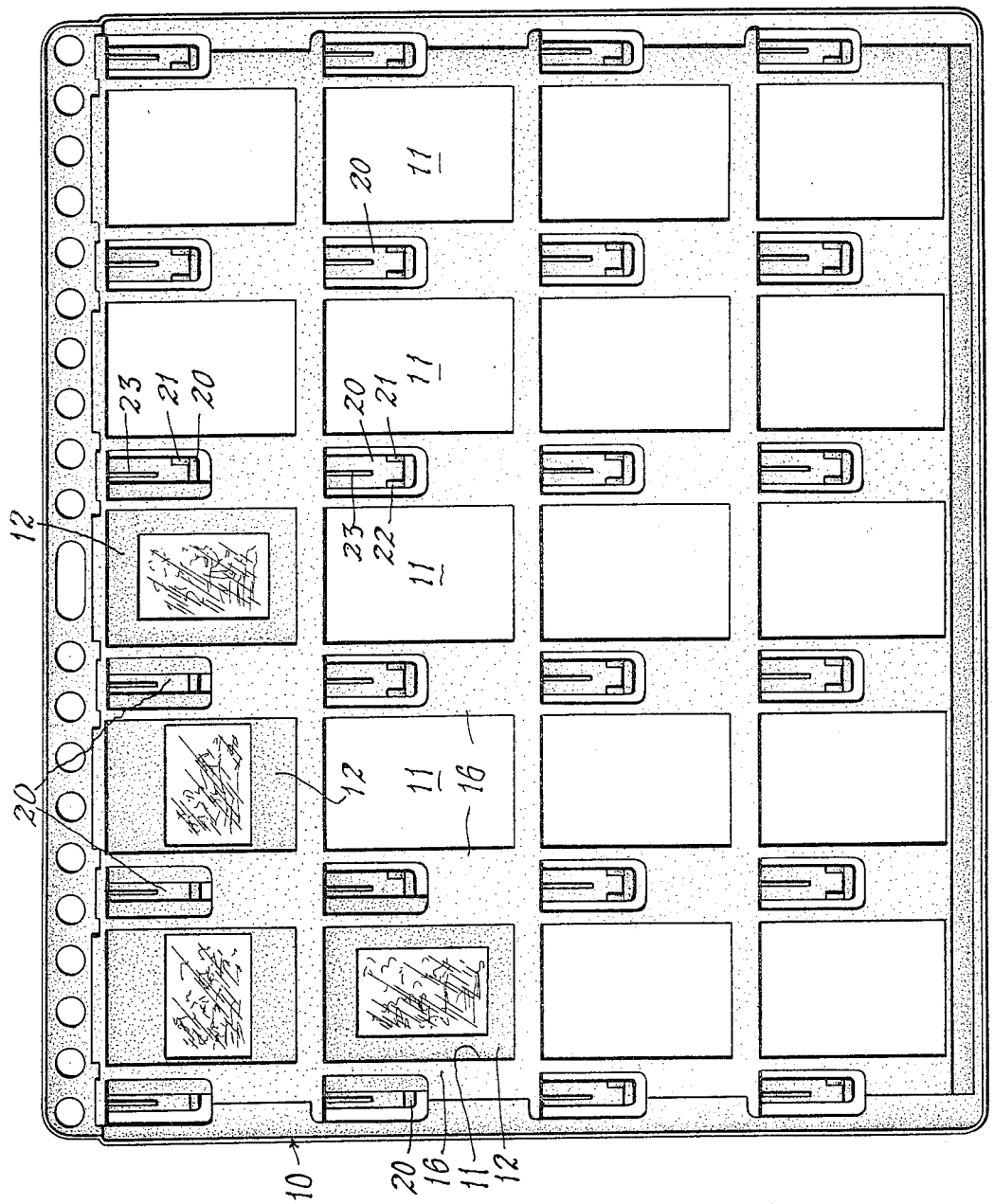

Oct. 11, 1966   R. A. LIGHTBURN   3,277,598
FRAMES FOR USE IN STORING PHOTOGRAPHIC SLIDES
Filed June 15, 1964   3 Sheets-Sheet 3
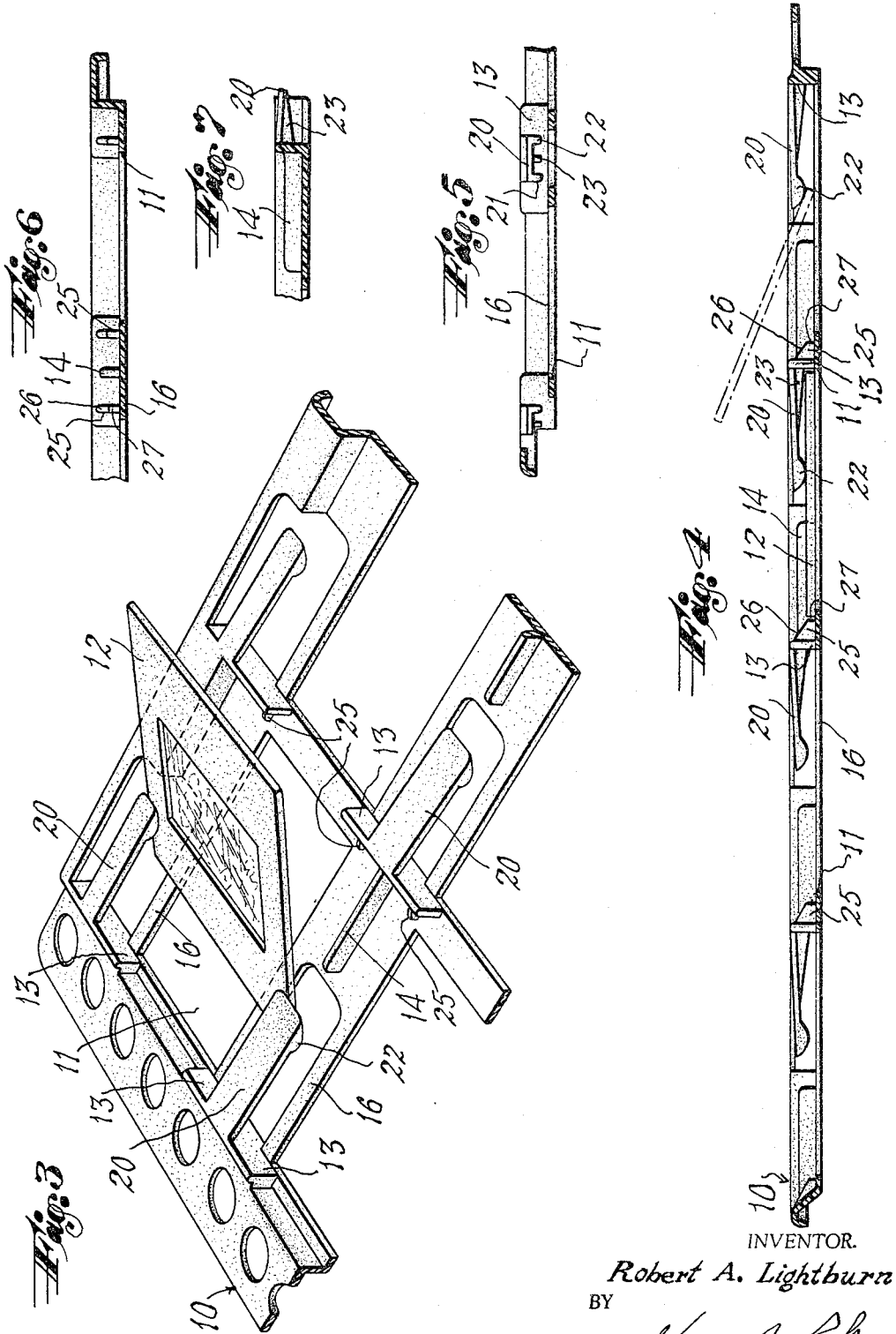
INVENTOR.
Robert A. Lightburn
BY
ATTORNEY 3,277,598
FRAMES FOR USE IN STORING PHOTOGRAPHIC
SLIDES
Robert A. Lightburn, Lakeside Trail, Butler, N.J.
Filed June 15, 1964, Ser. No. 375,195
7 Claims. (Cl. 40—158)

This invention relates to frames for use in storing photographic slides.

More particularly stated, the invention relates to a frame preferably of plastic material having a plurality of openings therethrough over which slides may be mounted for viewing of the slides by light passed through said openings, and means in connection with each opening for firmly engaging and positioning a slide when mounted thereover.

The invention has for its salient object the provision of a frame with a plurality of openings therethrough bounded by a slide engaging and positioning means and so constructed and arranged that the slides can be easily and quickly mounted therein and will be firmly and positively held in position.

Another object of the invention is to provide a slide holding frame of a simple, strong, durable and practicable construction and utilizing a minimum amount of material.

Further objects of the invention will be clear from the following specification taken in connection with the drawings which form a part hereof and in which:

FIG. 2 is a back plan view of the frame shown in FIG. 1.

FIG. 3 is an enlarged perspective view of one corner of the frame shown in FIG. 1, parts being shown in section.

FIG. 4 is a sectional elevation taken substantially on line 4—4 of FIG. 1 looking in the direction of the arrows.

FIG. 5 is a sectional elevation taken substantially on line 5—5 of FIG. 1 looking in the direction of the arrows.

FIG. 6 is a sectional elevation taken on line 6—6 of FIG. 1 looking in the direction of the arrows.

FIG. 7 is a fragmentary sectional elevation taken substantially on line 7—7 of FIG. 1 looking in the direction of the arrows.

Figure 1:
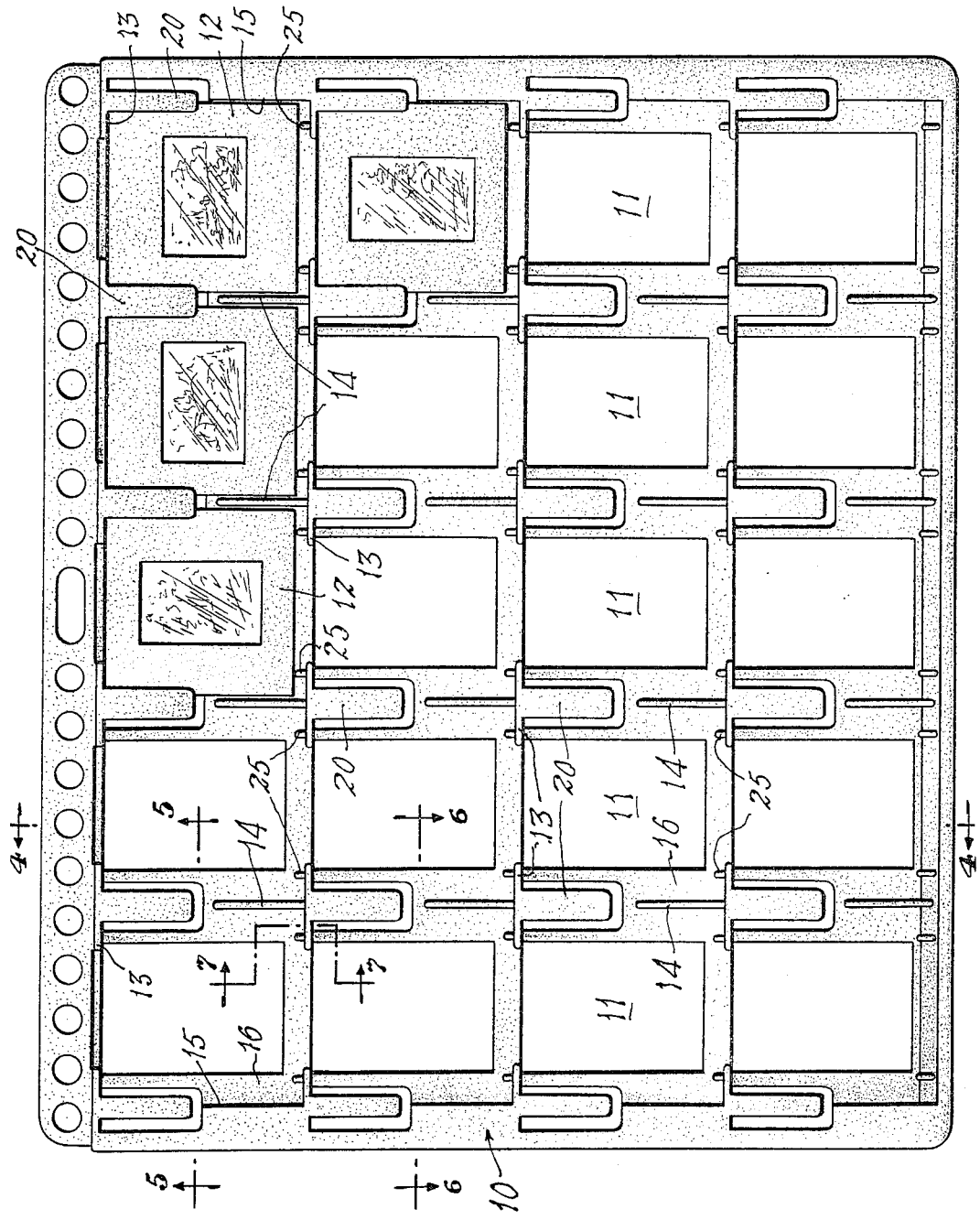
FIG. 1 is a front plan view of a slide holding frame constructed in accordance with the invention.

A rectangular frame 10 preferably formed of molded plastic material has a plurality of compartments each of which has an opening 11 therethrough, each opening being adapted to have mounted thereover in the compartment a photographic slide 12.

The slide is held in position by end walls or abutments 13, 13 disposed at each corner of the opening 11.

The slide is held against lateral displacement by ribs or abutments 14—14 which extend upwardly viewed in FIG. 1 for a portion of the distance between the abutments 13 and a portion of the length of the margins of the slide. This statement applies to all of the openings except the end openings and in the case of the end openings the outside edges of the slides are positioned between one of the ribs or abutments 14 and abutments or walls 15 at the end of the frame.

It will be noted that the frame comprises a plurality of frame bars 16, some equidistantly spaced apart and extending longitudinally and others equidistantly spaced apart and extending transversely of the frame and that each of the openings is formed by frame bars that have marginal supporting surfaces on which the slide rests; and the abutments 13 and 14 are disposed respectively on the longitudinal and the transverse bars.

Extending over the marginal supporting surface above mentioned are a plurality of resilient tongues 20 which are attached at their upper ends only to the abutments 13 and can be bent upwardly about the attached end. The tongues 20 are provided with a pair of ribs 21 and 22 which extend outwardly therefrom beneath the tongue and also adjacent the end of attachment of the tongue with reinforcing ribs 23 which also press the slide downwardly.

When a slide 12 is inserted the upper end thereof is pushed along the surfaces of the frame bars beneath the tongues 20 which, being resilient, can be bent upwardly to receive the slide and the upper edge of the slide engages the end wall or abutment 13, 13. The lower end of the slide engages stops 25, 25 which, as shown particularly in FIG. 4, have upper inclined portions 26 and vertical lower portions 27. The inclined portions 26 guide the slide to its lower position and the portions 27 hold the slide firmly in the position shown in FIG. 4. As also shown therein the tongues 20 press the slide downwardly to its bottom position in the compartment.

From the foregoing description it will be clear that a plurality of compartments has been provided in the frame 10 and means has been provided for positioning and holding the slide in each compartment in such a manner that it will not be loosened when a frame is handled. Moreover, it is very easy to insert the slide as shown in FIG. 3 beneath the tongues 20 and between the side walls, end wall and stops so that a slide can be accurately mounted in each compartment.

The openings 11 provide for free passage of light through the slides or photographic negatives for viewing of the slides or negatives, and the molded frame having the integral frame bars 16 provides a strong and durable construction with a minimum amount of material.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

I claim:

1. A storage frame for photographic slides having a plurality of compartments, each compartment having an end wall at one end of the compartment and stop means at the other end of the compartment and having marginal side walls extending longitudinally of the compartment for a portion of its length and having marginal, resilient tongues extending longitudinally of the compartment and toward and in endwise alignment with the inner ends of the side walls, each of said tongues being connected only at one end to an end wall and having portions for engaging and pressing the slide downwardly in the compartment.

2. A rectangular storage frame for photographic slides comprising integrally molded parallel longitudinal bars and parallel transverse bars forming between them a rectangular opening; said bars having slide-supporting surfaces providing for the laying of a photographic slide over said opening with the marginal portions of the slide resting on said slide-supporting surfaces so that light may freely pass through said opening and said slide, abutments projecting upwardly from said longitudinal bars and from said transverse bars, respectively, in spaced relation to the edges of said opening to abut the edges of said slide overlying said opening, said slide supporting surfaces and said abutments providing a compartment for said slide, and resilient tongues each extending longitudinally of and in spaced relation to a transverse bar and connected solely at one end to an abutment on a longitudinal bar and being otherwise free with its other end spaced from and in endwise alignment with an abutment on a transverse bar, portions of said tongues being formed for engaging and resiliently gripping the marginal edge portions of a slide between said tongues and said slide-supporting surfaces of the compartment.

3. A storage frame as set forth in claim 2 wherein said longitudinal bars and said transverse bars form a plurality of compartments arranged in side-by-side relation to each other and each resilient tongue has portions each of which extends into one of two adjacent compartments for engagement with a marginal portion of a slide in the corresponding compartment.

4. A storage frame as set forth in claim 2 wherein said abutments on the longitudinal bars comprise upstanding walls extending longitudinally of said longitudinal bars and across said transverse bars perpendicularly thereto.

5. A storage frame as set forth in claim 2 wherein said abutments on the transverse bars are upstanding ribs extending perpendicularly to and integrally with said abutments on the longitudinal bars.

6. A storage frame as defined in claim 2 with the addition of stops projecting upwardly from said slide-supporting surfaces at the sides of said abutments on the longitudinal bars opposite said tongues to abut the edges of slides in the compartments.

7. A storage frame as set forth in claim 3 wherein said abutments on the longitudinal bars comprise upstanding walls extending longitudinally of said longitudinal bars and across said transverse bars perpendicularly thereto and said abutments on the transverse bars are upstanding ribs between adjacent openings, each extending from one of said abutments on a longitudinal bar to a point spaced from the free end of one resilient tongue.

References Cited by the Examiner
UNITED STATES PATENTS

| | | | |
|---|---|---|---|
| 1,470,866 | 10/1923 | Newhouse | 40—156 |
| 2,592,386 | 4/1952 | Breakey | 40—63 |
| 2,968,882 | 1/1961 | Ozeki | 40—106.1 |

EUGENE R. CAPOZIO, *Primary Examiner.*

W. J. CONTRERAS, *Assistant Examiner.*